(12) United States Patent
Sawabe et al.

(10) Patent No.: US 7,403,504 B2
(45) Date of Patent: Jul. 22, 2008

(54) WIRELESS COMMUNICATIONS SYSTEM, PACKET TRANSMISSION DEVICE USED IN THE SYSTEM, AND ACCESS POINT

(75) Inventors: Kazuhide Sawabe, Ibaraki (JP); Masao Oomoto, Iizuka (JP); Yuichi Kawaguchi, Kasuya-Gun (JP); Satoshi Ando, Munakata-Gun (JP); Yuji Shimizu, Koga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1126 days.

(21) Appl. No.: 10/255,937

(22) Filed: Sep. 27, 2002

(65) Prior Publication Data

US 2003/0076791 A1 Apr. 24, 2003

(30) Foreign Application Priority Data

Sep. 27, 2001 (JP) ............................. 2001-295764

(51) Int. Cl.
*H04Q 7/00* (2006.01)
(52) U.S. Cl. ...................................... 370/331; 455/436
(58) Field of Classification Search ............ 370/310.02, 370/331–332; 455/452.2
See application file for complete search history.

(56) References Cited

U.S. PATENT DOCUMENTS

| | | | | |
|---|---|---|---|---|
| 6,205,128 B1 * | 3/2001 | Le | ............................. | 370/331 |
| 6,330,451 B1 * | 12/2001 | Sen et al. | ................. | 455/452.2 |
| 6,477,373 B1 * | 11/2002 | Rappaport et al. | .......... | 455/436 |
| 6,865,393 B1 * | 3/2005 | Baum et al. | .............. | 455/452.2 |
| 7,120,159 B2 * | 10/2006 | Kumazawa et al. | ......... | 370/412 |
| 7,254,392 B2 * | 8/2007 | Kauhanen | .................. | 455/436 |
| 7,283,468 B1 * | 10/2007 | Hill et al. | .................... | 370/229 |
| 2002/0107000 A1 * | 8/2002 | Goss et al. | .................. | 455/405 |
| 2004/0114516 A1 * | 6/2004 | Iwata et al. | .............. | 370/230.1 |
| 2004/0125815 A1 * | 7/2004 | Shimazu et al. | ............. | 370/411 |
| 2004/0156364 A1 * | 8/2004 | Kawaguchi et al. | ......... | 370/389 |
| 2005/0129036 A1 * | 6/2005 | Sawabe | ...................... | 370/401 |
| 2007/0030803 A1 * | 2/2007 | Gooch et al. | ................ | 370/230 |

(Continued)

FOREIGN PATENT DOCUMENTS

EP 1429499 A2 * 6/2004

(Continued)

OTHER PUBLICATIONS

Bharghavan et al. (The Timely adaptive resource management architecture, Personal Communications, IEEE vol. 5, Issue 4, Aug. 1998 pp. 20-31.*

(Continued)

*Primary Examiner*—Edan Orgad
*Assistant Examiner*—Salman Ahmed
(74) *Attorney, Agent, or Firm*—Wenderoth, Lind & Ponack, L.L.P.

(57) ABSTRACT

Access points for supporting wireless communications, a packet transmission device, and terminals for handing-over between service areas are provided. An existing terminal is provided with respect to this access point for performing a Quality of Source (QoS) guarantee. Accordingly, when a new terminal is handed over to be engaged in wireless communications with this access point, the priority of the packet associated with the existing terminal and/or new terminal is changed.

4 Claims, 6 Drawing Sheets

U.S. PATENT DOCUMENTS

2007/0133552 A1 * 6/2007 Kubo et al. .............. 370/395.2

FOREIGN PATENT DOCUMENTS

| EP | 1441479 A2 * | 7/2004 |
|----|----|----|
| EP | 1580935 A2 * | 9/2005 |
| EP | 1624621 A1 * | 2/2006 |
| WO | WO 01/65881 A1 * | 9/2001 |

OTHER PUBLICATIONS

Feng et al. (Adaptive Packet/Marking for Providing Differentiated Services in the Internet, Network Protocols, 1998. Proceedings. Sixth International Conference on Oct. 13-16, 1998, pp. 108-117).*

Adaptive quality of service handoff priority scheme for mobile multimedia networks; Wei Zhuang; Bensaou, B.; Kee Chaing Chua; Vehicular Technology, IEEE Transactions on vol. 49, Issue 2, Mar. 2000 pp. 494-505.*

"Special Article 1: Speed Test for Wireless LAN- Test 3", Nikkei Network, vol. 2002.11, pp. 66-67, 2002.

* cited by examiner

Fig. 2(a)

| VER | IHL | TOS | Total Length | |
|---|---|---|---|---|
| Identification | | | Frag | Fragment Offset |
| TTL | | Protocol | Header Checksum | |
| Source Address | | | | |
| Distination Address | | | | |
| Options | | | Padding | |

IPv4 header

Fig. 2(b)

| VER | TC | Flow Label | |
|---|---|---|---|
| Payload Length | | Next Header | Hop Limit |
| Source Address | | | |
| Distination Address | | | |

IPv6 header

WIRELESS COMMUNICATIONS SYSTEM, PACKET TRANSMISSION DEVICE USED IN THE SYSTEM, AND ACCESS POINT

BACKGROUND OF THE INVENTION

1. Field of the Invention

The present invention relates to a wireless communications system provided with a hand-over (automatic change-over of an access point with respect to a terminal) for engaging in wireless communications with an access point. Then, the present invention relates to a technology for guaranteeing QoS (quality of service) in this kind of wireless communications system.

2. Description of the Related Art

This kind of wireless communications system allows a terminal to move between service areas of an access point.

Then, when the terminal moves from a service area of the access point to a service area of the next access point, the connection of the terminal is automatically changed over (handed over) to the next access point.

That is, in this kind of wireless communications system, the terminal has a hand-over function.

Furthermore, as seen from the next access point, this terminal which has moved to its own service area is a new terminal. Here, when no existing terminal which is already connected to this access point is present, no malfunction is caused even when the new terminal is connected to this access point.

However, when there is an existing terminal which is already connected to the next access point, some malfunctions may be caused in the wireless communications in a competition between the existing terminal and new terminal.

Hereinafter, this point will be explained by citing an example. FIG. 8 is a schematic view of a conventional wireless communications system.

In the wireless communications system shown in FIG. 8, there are two terminals; a terminal 1 and a terminal 2.

At present, terminal 1 exists in the service area of access point 3 to be connected therewith. Furthermore, terminal 2 exists in the service area of access point 4 to be connected therewith.

An access point 3 and terminal 1, and access point 4 and terminal 2 are connected by a link having a transmission bandwidth of 10 Mbps. To terminal 1 and terminal 2, packets 6 and 7 of the image data (MPEG 2: 6 Mbps) with the same priority (here, the priority is "medium") are transmitted.

Furthermore, packet transmission device 5 has an access point 3 and an access point 4 under the control of the device. Packet transmission device 5 and access point 3, and packet transmission device 5 and access point 4 are connected by a communications line of 100 Mbps. Furthermore, for guaranteeing QoS, either or all of packet transmission device 5, access point 3, and access point 4 are provided with QoS guarantee means which is configured of a scheduler, a shaper, and a queue. With the QoS guarantee means, the priority of the packet which flows through the wireless communications system shown in FIG. 8 is controlled.

Furthermore, the "packet transmission device 5" described here has various forms such as a gateway (including a home gateway), a router, a switch or a board which serves as a major function. However, any form will do.

Then, in the condition shown in FIG. 8, only communications less than the transmission bandwidth is provided with respect to any of the terminals. Consequently, both terminal 1 and terminal 2 can receive communications without any malfunction at all.

SUMMARY OF THE INVENTION

However, referring to FIGS. 8-9, when the user having terminal 1 walks in a direction of an arrow NI to be distant from a service area of access point 3, the user comes close to a service area of access point 4.

At this time, as seen from access point 4, terminal 2 is an existing terminal which is already connected and terminal 1 is a new terminal which newly comes into the service area of access point 4.

Here, as shown in FIG. 9, the transmission of packet 6 to terminal 1 and the transmission of packet 7 to terminal 2 have the same priority.

Here, in the prior art, in a case where the priority of these terminals 1 and 2 connected to access point 4 are completely the same, the two terminals 1 and 2 are fairly handled.

However, access point 4 has only the transmission bandwidth of 10 Mbps. As a consequence, in response to impartiality, a transmission bandwidth of 5 Mbps is allocated to each of terminals 1 and 2.

Under these circumstances, the transmission bandwidth (5 Mbps) is lacking as compared with the transmission capacity (6 Mbps) both in terminal 1 and terminal 2 with the result that both packets 6 and 7 are lost. That is, disorder is generated in the image received by terminal 1 and terminal 2, so that the transmission quality is deteriorated.

In particular, from the viewpoint of the user of terminal 2, the quality of the received image is suddenly deteriorated only with an approach of the user of terminal 1 despite the fact that the user has done nothing, so that the user cannot help dissatisfying.

Furthermore, a case of distributing an image has been explained. In a case of an object which can be transmitted in packets, the same problem as described above is present in any data.

Therefore, an object of the present invention is to provide a wireless communications system which can suppress, as much as possible, a disadvantage resulting from a hand-over of the terminal.

The wireless communications system according to a first aspect of the present invention includes, a plurality of access points for supporting wireless communications in a service area, a transmission device connected to upstream sides of the access points and controlling the access points, a plurality of terminals including an existing terminal which is already engaged in wireless communications with a point included in the access points and a new terminal different from the existing terminal, and a priority changing unit, wherein the terminals are formed in a manner movable between the service areas of the access points and have a hand-over function at the time of movement between the service areas, and wherein the priority changing unit, when the new terminal is handed over to be engaged in wireless communications with the point, changes one or both of the priorities of the packets associated with the existing terminal and the priorities of the packets associated with the new terminal.

In this configuration, the priority changing unit appropriately changes the priority of the existing and/or the new terminals, so that the priority of the packet can be mediated and the disadvantage resulting from the hand-over at the terminal can be eliminated.

In the wireless communications system according to a second aspect of the present invention, the priority changing unit changes the priority so that the packet priority associated with the new terminal becomes lower than the packet priority associated with the existing terminal.

With such a configuration, a priority is given to a packet associated with the existing terminal which is not associated with the hand-over, so that actual fairness can be improved.

That is, with respect to the new terminal which has been handed over, the allocated transmission bandwidth is suppressed. A user of the new terminal can know in advance that his or her own action may bring about a competition even by acting in this manner, so that they have little dissatisfaction. Furthermore, a user of the existing terminal has no dissatisfaction because the communications quality is not suddenly deteriorated.

In the wireless communications system according to a third aspect of the present invention, the priority changing unit changes the priority in accordance with the change rules which are stipulated in advance.

With this structure, a soft mediation is enabled in addition to classification such as new and existing terminals. For example, for each terminal, a priority is determined. Even with a new terminal, the communications quality can be secured in priority for each of the terminals.

The wireless communications system according to a fourth aspect of the present invention comprises a bandwidth measurement unit for measuring a bandwidth usage condition with respect to the point. When a sufficient free bandwidth is available, priority change with the priority changing unit is omitted.

With this structure, an unnecessary priority change is eliminated thereby making an attempt of simplifying the processing and heightening the speed.

The wireless communications system according to a fifth aspect of the present invention comprises change notification unit for notifying a change in priority with respect to a terminal associated with a packet which is changed so that the priority is lowered.

With this structure, a user of the terminal whose priority is lowered can accept notification of the priority change, a condition ceases to exist in which the communications quality is suddenly lowered so that dissatisfaction can be alleviated.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2(*a*) and FIG. 2(*b*) are illustrative views of the same header structure.

DETAILED DESCRIPTION OF THE INVENTION

Figure 8:
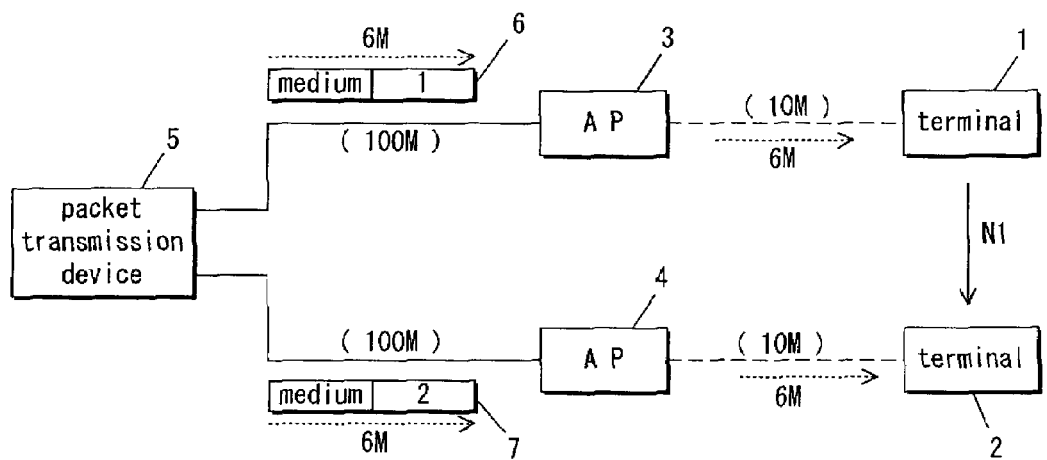
FIG. 8 is a schematic view showing a conventional wireless communications system.
Figure 9:
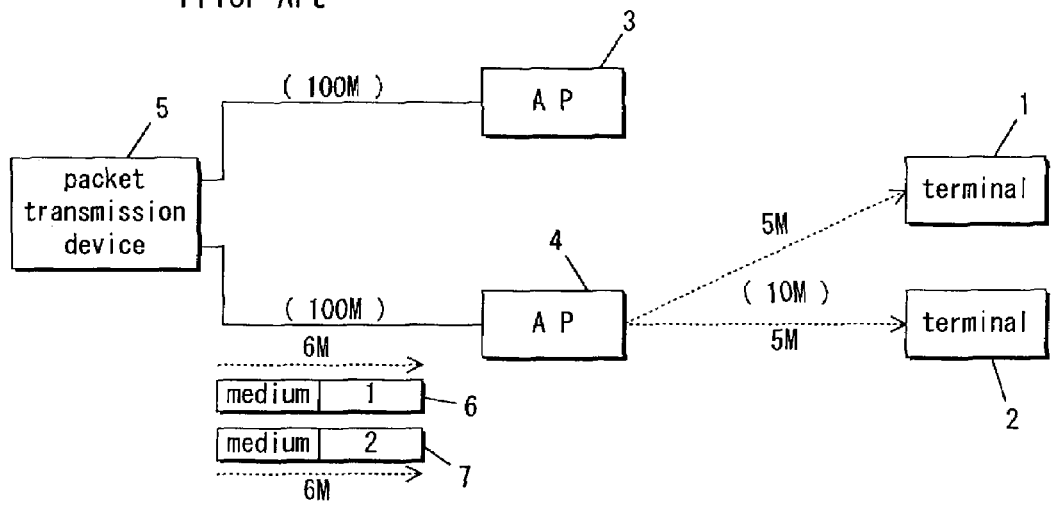
FIG. 9 depicts a specific example of the conventional wireless communications system.

Hereinafter, referring to the drawings, embodiments of the present invention will be explained. Furthermore, constituent elements identical to FIG. 8 and FIG. 9 showing a conventional structure are denoted by the same reference numerals. An explanation thereof is omitted.

Figure 1:
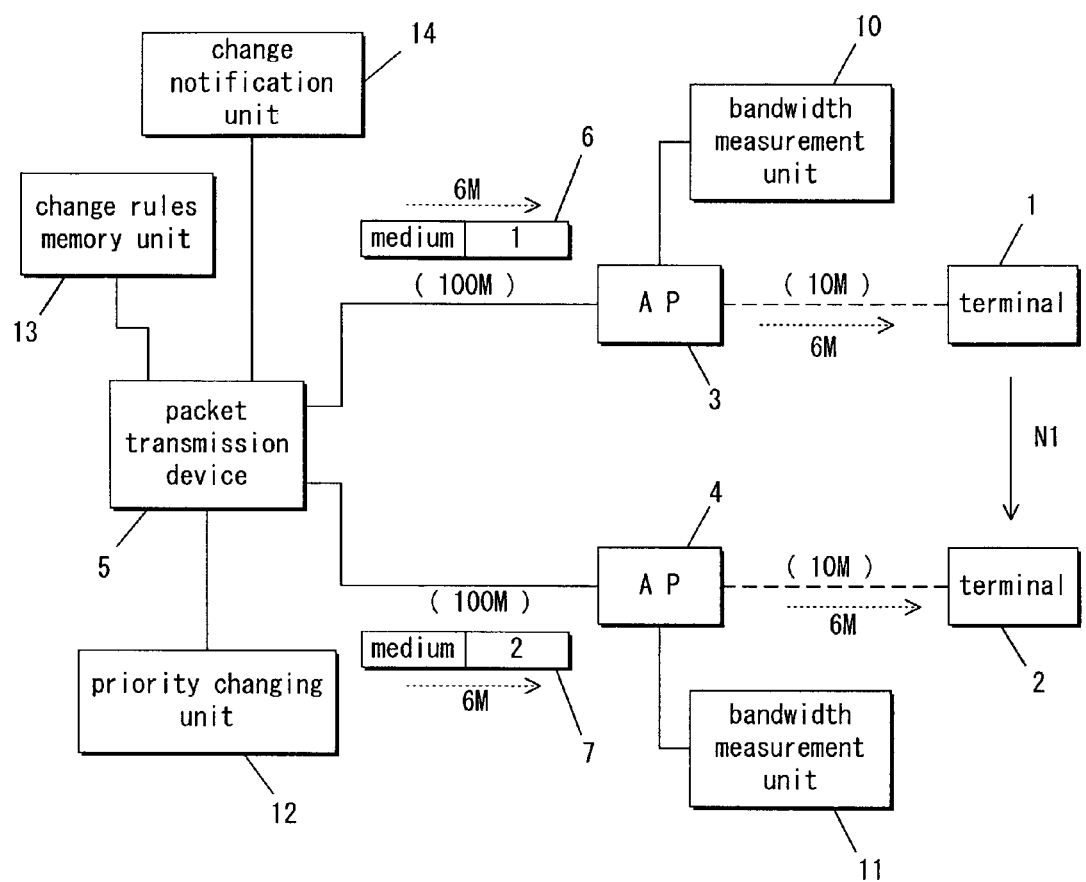
FIG. 1 is a schematic view showing a wireless communications system according to an embodiment of the present invention.

First, by using FIG. 1, constituent elements of the wireless communications system according to the embodiment will be explained. An example shown in FIG. 1 is engaged in communications identical to FIG. 8 and FIG. 9 showing the prior art.

In the embodiment, as compared with FIG. 8, a bandwidth measurement unit 10 and 11, priority changing unit 12, change rules memory unit 13 and change notification unit 14 are added. The bandwidth measurement unit 10 and 11, priority changing unit 12, change rules memory unit 13 and change notification unit 14 may be provided at any location as long as the bandwidth measurement unit 10 and 11, priority changing unit 12, change rules memory unit 13 and change notification unit 14 can engage communications with this wireless communications unit from their respective locations. Furthermore, the priority changing unit 12 is required. However, the bandwidth measurement unit 10 and 11, the change rules memory unit 13, and the change notification unit 14 can be omitted.

Furthermore, the bandwidth measurement unit 10 recognize the whole transmission bandwidth of access point 3 while unit 10 measures the current usage condition with respect to access point 3. As a consequence, when a new bandwidth request is made, it is measured as to whether a sufficient free bandwidth exists.

The bandwidth measurement unit 11 performs the same processing as bandwidth measurement unit 10 with respect to access point 4.

The provision of the bandwidth measurement unit 10 and 11 eliminates any unnecessary priority changes thereby simplifying the processing and heightening the speed of data transmission. The bandwidth measurement unit 10 and 11 are provided at access points 3 and 4 as shown in the drawings so as to report the measurement results to the packet transmission device 5. The packet transmission device 5 may control package access points 3 and 4.

The priority changing unit 12 has an existing terminal which is already engaged in wireless communications with either of access points 3 and 4. At the same time, when a new terminal which is different from this existing terminal is handed over to be engaged in wireless communications with this access point, one or both of the priorities are changed among the packets associated with the existing terminal and the packets associated with the new terminal. In addition, a detailed operation will be explained later by using FIG. 3.

The change rules memory unit 13 stores the predefined change rules in order to change the priority. The change rules memory unit 13 is typically configured as one area of a device such as a hard disk, a memory and the like. Then, the priority changing unit 12 changes the priority by referring to the change rules of the change rules memory unit 13 when required.

The change rules might be such that a priority is given to the existing terminal rather than the new terminal. Otherwise, according to the rules a priority is given to the new terminal rather than to the existing terminal.

However, when a priority is given to the existing terminal rather than to the new terminal, a user of the new terminal can know in advance that competition is generated by his or her own action with the result that dissatisfaction is small, and a user of the existing terminal has no dissatisfaction because of the absence of an abrupt deterioration in communications quality, which is favorable.

Furthermore, when the priority is determined for each of the terminals as these change rules, the communications quality can be secured in priority even with the new terminal, so that soft mediation is enabled. For example, a case is considered in which a high priority is given at all times with respect to a terminal for working, and a case in which the terminal for playing is given no priority depending upon the condition, and a case in which whereby the priority of the terminal used by an executive is held at a high level.

In addition, the change rules may be described in a simple program language having a control structure such as if statements, while statements and the like. At this time, a parser or the like for interpreting this program language or the like is provided in the different unit from the priority change unit 12 itself or in a different unit which operates in cooperation with the priority change unit 12.

The change notification unit 14 notifies the priority change to the terminal associated with the packet which is changed to lower the priority.

When the change notification unit 14 is provided, a previous notice of the priority change is sent to the user of the terminal whose priority is lowered prior to the priority change with the result that a condition ceases to exist in which the communications quality is suddenly deteriorated so that dissatisfaction of the user can be alleviated.

FIGS. 2(a) and 2(b) show an example of a header structure of the packet. Here, an example of the IP packet is shown.

For example, the IPv4 has a header structure as shown in FIG. 2(a). The priority is written in the TOS (Type of Service) field.

Furthermore, the IPv6 has a header structure shown in FIG. 2(b). The priority is written in the TC (Traffic Class) field.

In accordance with the priority of these fields, the packet is transmitted, so that the QoS guarantee is performed. Of course, what is shown in the drawings is simply an illustration of an example. When the priority information can be stored in the packet, the present invention can be applied in a similar manner. For example, the priority is stored in the priority information of the VLAN tag of the MAC layer, and this can be changed.

Next, referring to FIG. 3, the priority change process will be explained. Of course, this processing is performed for each access point.

Furthermore, first, at step 1, the priority changing unit 12 checks whether or not the hand-over is generated in the service area of the access point. When the hand-over is not generated, there is no need for the priority change. Consequently, the process returns to step 1.

When the hand-over is generated, it is assumed that competition for connection is generated in the existing terminal and new terminal which is already connected. Consequently, the process moves to step 2.

At step 2, when the bandwidth measurement unit 10 and 11 exist, the process moves to step 3. Without the bandwidth measurement unit 10 and 11, step 3 is skipped to move to step 4.

At step 3, it is measured whether a sufficient free bandwidth exists with respect to the corresponding access point by using the bandwidth measurement unit 10 and 11.

When a sufficient surplus free bandwidth is available, the priority change is omitted and the process returns to step 1. Consequently, wasteful processing is eliminated so that a increased speed in processing is advanced.

When no sufficient free bandwidth exists, the process moves to step 4.

At step 4, the priority changing unit 12 investigates whether or not the change notification unit 14 exists and effective change rules are described. When the investigation result is affirmative, the priority changing unit 12 changes the priority in accordance with the change rules (step 5). Then, the process moves to step 7.

When the investigation result is negative, the priority is given to the existing terminal and the priority of the packet associated with the new terminal is lowered (step 6), and the process moves to step 7.

At step 7, the priority changing unit 12 investigates whether or not the change notification unit 14 exists. When the change notification unit 14 exists, the change notification unit 14 is used to notify the change to the terminal at which the priority is changed in an unfavorable manner (step 8). When no change notification unit 14 exists, no notification of a change is given.

Furthermore, steps 7 and 8 may be performed before steps 5 and 6.

Next, various cases will be explained by using FIG. 4 through FIG. 7.

(Case 1)

Figure 3:
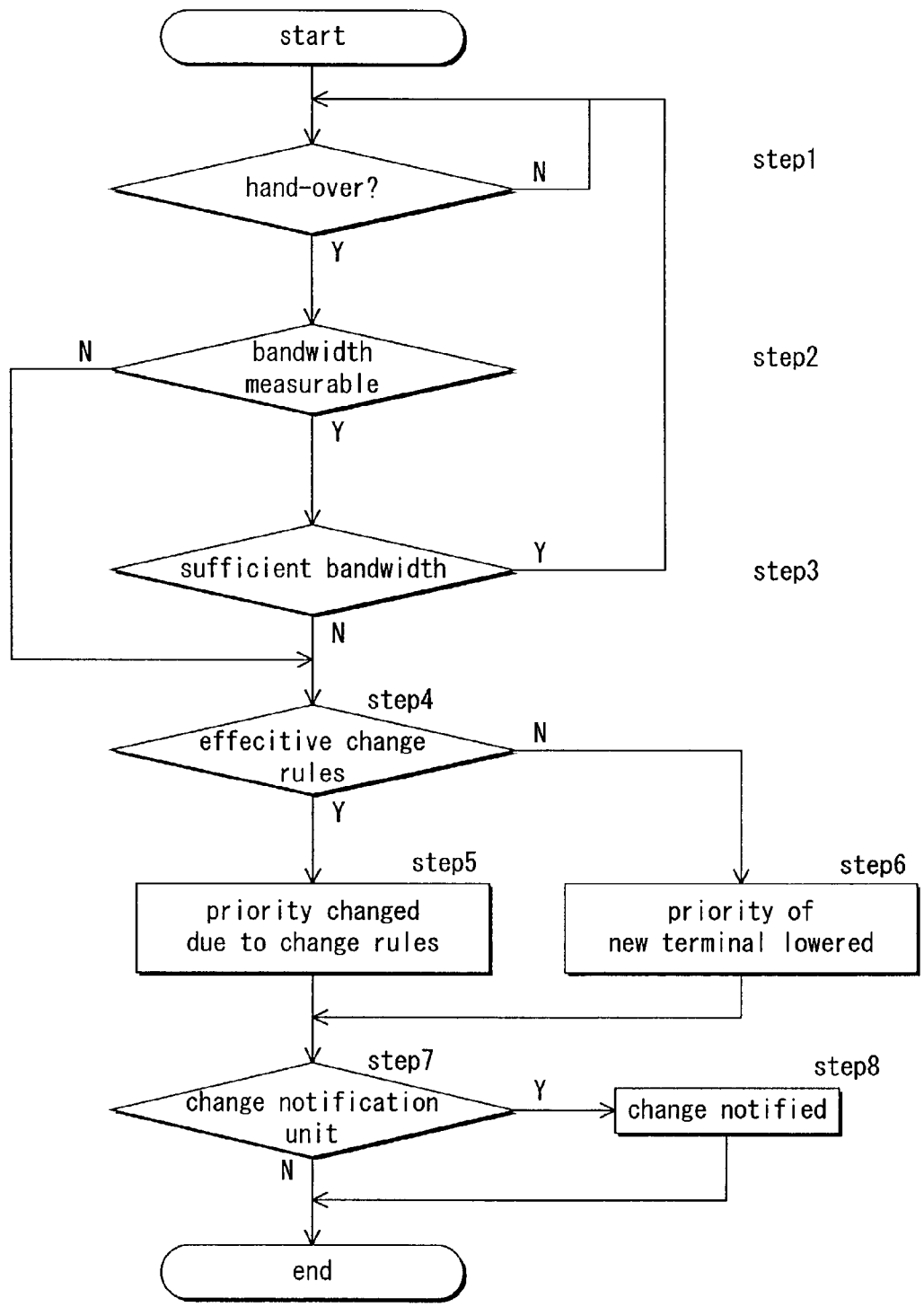
FIG. 3 is a flowchart showing a processing of changing the priority.
Figure 4:
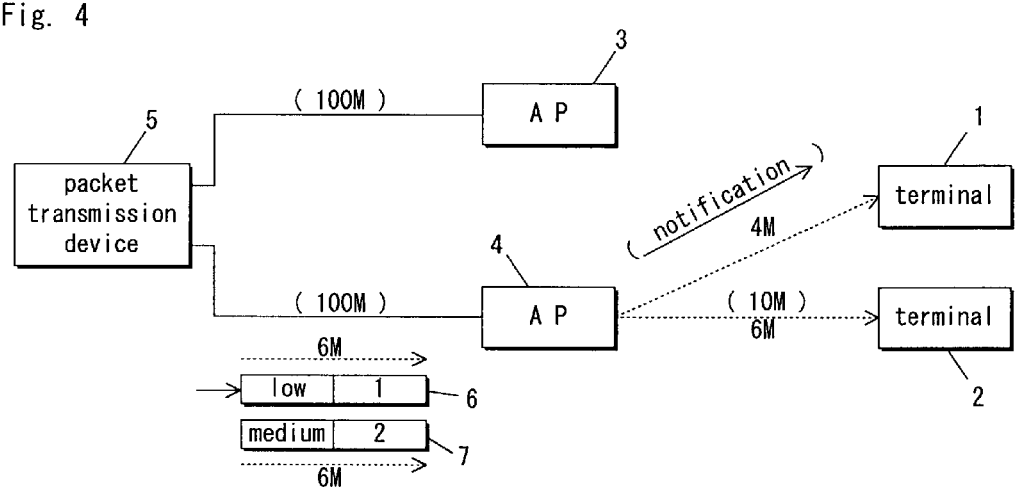
FIG. 4 depicts a specific example of the wireless communications system.

First, the case shown in FIG. 4 is a case in which the priority with respect to the new terminal is lowered by step 6 of FIG. 3.

When the new terminal enters into the service area of the access point 4 in the condition of FIG. 1, the condition shown in FIG. 4 is provided. At this time, as shown in FIG. 4, the priority changing unit 12 changes the priority of the packet 6 to the terminal 1 from "medium" to "low."

Consequently, the packet 7 (the priority remaining "medium") to terminal 2 provided with a relatively high priority is given priority in transmission. As a result, the terminal 2 can secure the bandwidth of 6 Mbps as it is.

On the other hand, since terminal 1 is new, only the bandwidth of 4 Mbps is allocated, and the quality received by terminal 1 is deteriorated. This results from movement of the user of terminal 1 himself, so that the user of terminal 1 can accept the condition.

Furthermore, it is desirable to notify terminal 1 in advance of the fact that priority is changed by providing the change notification unit 14.

(Case 2)

Next, the case of FIG. 5 will be explained. In this case, it is described that the change rules unit 13 is effective, terminal 1 gives a very high priority to change rules memory unit 13, and terminal 2 may change the priority depending upon the condition. Then, the condition identical to FIG. 4 results in a condition shown in FIG. 5.

Figure 5:
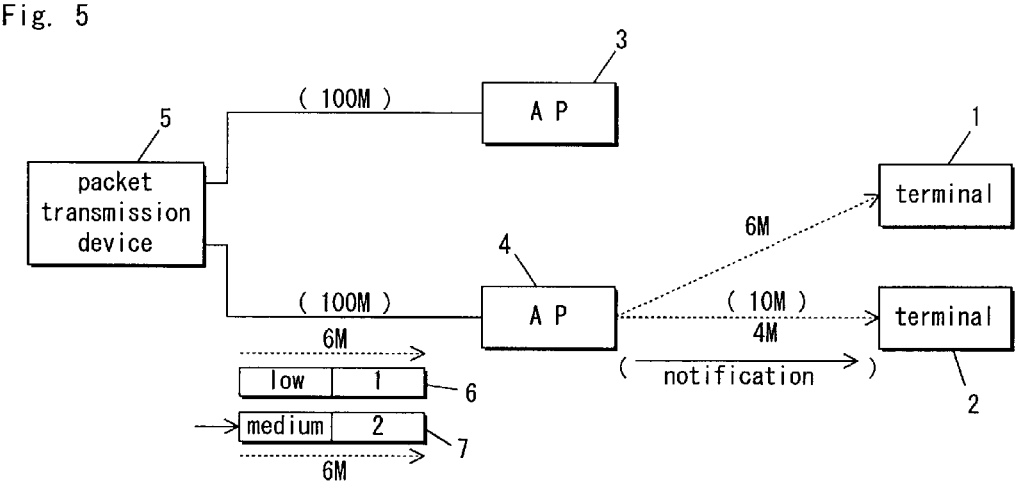
FIG. 5 depicts a specific instance of the wireless communications system.

That is, in step 5 of FIG. 5, the priority changing unit 12 gives a priority to the new terminal 1, and no priority is given to the existing terminal 2. As a consequence, as shown in FIG. 5, a condition that reverses the condition shown in FIG. 4 is generated.

(Case 3)

Next, the case of FIG. 6 will be explained. In this case, bandwidth measurement unit 10 and 11 are effective, and the process moves from step 2 to step 3. Furthermore, this is a case in which despite the generation of the hand-over, a sufficient free bandwidth exists and the priority changing unit 12 returns the processing from step 3 to step 1.

Figure 6:
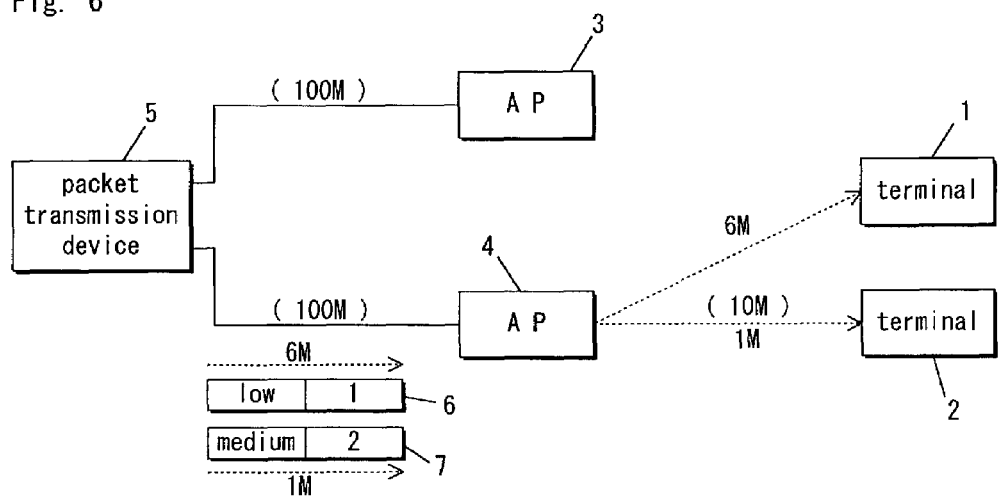
FIG. 6 depicts a specific instance of the wireless communications system.

As shown in FIG. 6, in this case, since the terminal 1 uses 1 Mbps and the terminal 2 uses 6 Mbps, only 7 Mbps can be used for the sake of convenience. At this time, since a sufficient free bandwidth exists after the hand-over, priority changing unit 12 omits the priority change, so that the priorities of packet 6 and packet 7 both remain "medium."

(Case 4)

Figure 7:
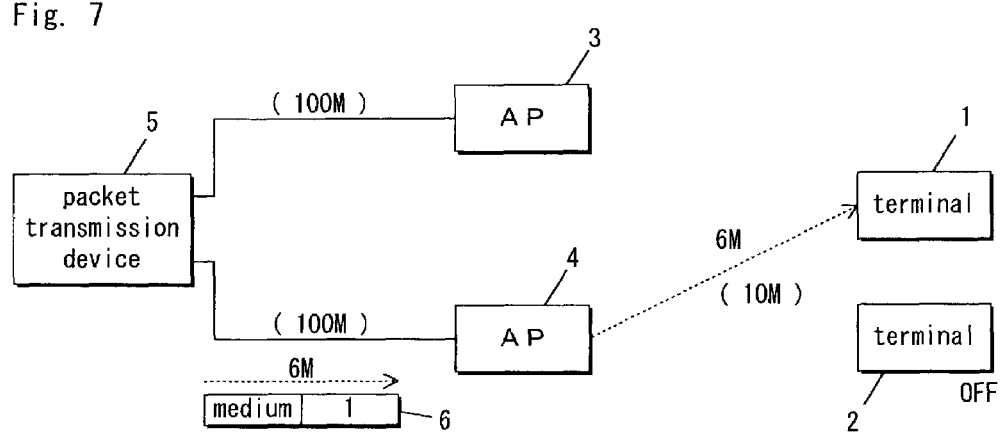
FIG. 7 depicts a specific instance of the wireless communications system.

Furthermore, there is a case as shown in FIG. 7. This consequence is the same as FIG. 6. Before terminal 1 is handed over to access point 4, a condition identical to that of FIG. 1 exists. When terminal 2 continues connection, it is scheduled that the process moves to a condition as shown in FIG. 4 or FIG. 5.

However, in the case shown in FIG. 7, terminal 2 terminates communications immediately after terminal 1 is handed over to access point 4. At this time, the priority changing unit 12 is moved from step 3 in FIG. 3 to step 1, so that the priority is not changed. Consequently, new terminal 1 can be engaged in wireless communications free from the complete change of the priority of the packet before and after the hand-over.

According to the present embodiment, the priority changing unit 12 can mediate the priority of the packet and can suppress a disadvantage resulting from a hand-over of the terminal by appropriately changing the priority of the existing terminal and new terminal.

Furthermore, a high priority is given to the packet associated with the existing terminal and not associated with the hand-over so that actual fairness can be improved.

Furthermore, a soft mediation can be mediated with the change rules of the priority.

Furthermore, the processing can be heightened in speed by eliminating the unnecessary priority change.

Furthermore, dissatisfaction can be alleviated with a notification of the priority change.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A wireless communication system for guaranteeing a quality of service by changing a priority of data packets to be transmitted, said wireless communication system comprising:

a plurality of access points, each access point from said plurality of access points operable to perform wireless communication in a respective service area;

a packet transmission device arranged at an upstream side of said plurality of access points and operable to communicate with and control said plurality of access points;

a plurality of terminals operable to communicate with said plurality of access points, move between the respective service areas of each access point from said plurality of access points, and execute a hand-over function for allowing admission to said plurality of access points at a time of movement between the respective service areas, said plurality of terminals including one existing terminal already engaged in wireless communication with one access point of said plurality of access points and one new terminal being a terminal which (i) is newly handed-over to said one access point to which said one existing terminal is engaged in wireless communication with, and (ii) executes the hand-over function at a time of the hand-over to initially allow admission of said one new terminal to said one access point;

a priority changer operable to, after the time of said one new terminal being newly handed-over to said one access point during which the hand-over function is executed to initially allow admission of said one new terminal to said one access point, subsequently change the priority of data packets to be transmitted to one or both of said one existing terminal and said one new terminal of said plurality of terminals, the priority of the data packets being changed according to predefined change rules, such that a priority of a data packet to be transmitted to said one new terminal becomes lower than a priority of a data packet to be transmitted to said one existing terminal;

a bandwidth measurement unit operable to measure a bandwidth usage for each terminal of said plurality of terminals, wherein, if a specific bandwidth usage exists, said priority changer is operable to omit the changing of the priority of data packets; and a change notification unit operable to provide a notification of a priority change to any terminal of said plurality of terminals of which a priority of a data packet to be transmitted thereto has been lowered by said priority changer.

2. A packet transmission device for use with a wireless communication system for guaranteeing a quality of service by changing a priority of data packets to be transmitted, wherein the wireless communication system includes a plurality of access points, each access point from the plurality of access points operable to perform wireless communications in a respective service area, and a plurality of terminals operable to communicate with the plurality of access points, move between the respective service areas of each access point from the plurality of access points, and execute a hand-over function for allowing admission to said plurality of access points at a time of movement between the respective service areas, the plurality of terminals including one existing terminal already engaged in wireless communication with one access point of the plurality of access points and one new terminal, the one new terminal being a terminal which (i) is newly handed-over to the one access point to which the one existing terminal is engaged in wireless communication with, and (ii) executes the hand-over function at a time of the hand-over to initially allow admission of said one new terminal to said one access point, the packet transmission device comprising:

a priority changer operable to, after the time of said one new terminal being newly handed-over to said one access point during which the hand-over function is executed to initially allow admission of said one new terminal to said one access point, subsequently change the priority of data packets to be transmitted to one or both of the one existing terminal and the one new terminal of the plurality of terminals, the priority of the data packets being changed according to predefined change rules, such that a priority of a data packet to be transmitted to the one new terminal becomes lower than a priority of a data packet to be transmitted to the one existing terminal;

a controller device arranged at an upstream side of the plurality of access points and operable to control each access point of the plurality of access points;

a bandwidth measurement unit operable to measure a bandwidth usage for each terminal of the plurality of terminals, wherein, if a specific bandwidth usage exists, said priority changer is operable to omit the changing of the priority of data packets; and a change notification unit operable to provide a notification of a priority change to any terminal of the plurality of terminals of which a priority of a data packet to be transmitted thereto has been lowered by said priority changer.

3. An access point for use with a wireless communication system for guaranteeing a quality of service by changing a priority of data packets to be transmitted, wherein the wireless communication system includes a packet transmission device, a plurality of terminals including one existing terminal already engaged in wireless communication with said access point and one new terminal being a terminal which is newly handed-over to said access point, wherein the plurality of terminals are movable between service areas and are operable to execute a hand-over function for allowing admission to said access point at a time of movement between the service areas, said access point comprising:

a priority changer operable to, after a time of said one new terminal being newly handed-over to said access point being a time during which the hand-over function is executed to initially allow admission of said one new terminal to said access point, subsequently change the priority of data packets to be transmitted to one or both of the one existing terminal and the one new terminal of the plurality of terminals, the priority of the data packets being changed according to predefined change rules, such that a priority of a data packet to be transmitted to the one new terminal becomes lower than a priority of a data packet to be transmitted to the one existing terminal;

a bandwidth measurement unit operable to measure a bandwidth usage for each terminal of the plurality of terminals, wherein, if a specific bandwidth usage exists, said priority changer is operable to omit the changing of the priority of data packets; and a change notification unit operable to provide a notification of a priority change to any terminal of the plurality of terminals of which a priority of a data packet to be transmitted thereto has been lowered by said priority changer.

4. A wireless communication system for guaranteeing a quality of service by changing a priority of data packets to be transmitted, said wireless communication system comprising:

a plurality of access points, each access point from said plurality of access points operable to perform wireless communications in a respective service area;

a packet transmission device arranged at an upstream side of said plurality of access points and operable to communicate with and control said plurality of access points;

a plurality of terminals operable to communicate with said plurality of access points, move between the respective service areas of each access point from said plurality of access points, and execute a hand-over function for allowing admission to said plurality of access points at a time of movement between the respective service areas, said plurality of terminals including one existing terminal already engaged in wireless communication with one access point of said plurality of access points and one new terminal being a terminal which (i) is newly handed-over to said one access point to which said one existing terminal is engaged in wireless communication with, and (ii) executes the hand-over function at a time of the hand-over to initially allow admission of said one new terminal to said one access point;

a priority changer operable to, after the time of said one new terminal being newly handed-over to said one access point during which the hand-over function is executed to initially allow admission of said one new terminal to said one access point, subsequently change the priority of data packets to be transmitted to one or both of said one existing terminal and said one new terminal of said plurality of terminals, the priority of the data packets being changed according to predefined change rules, such that a priority of a data packet to be transmitted to said one new terminal becomes higher than a priority of a data packet to be transmitted to said one existing terminal;

a bandwidth measurement unit operable to measure a bandwidth usage for each terminal of said plurality of terminals, wherein, if a specific bandwidth usage exists, said priority changer is operable to omit the changing of the priority of data packets; and a change notification unit operable to provide a notification of a priority change to any terminal of said plurality of terminals of which a priority of a data packet to be transmitted thereto has been raised by said priority changer.

* * * * *